United States Patent
Yao et al.

(10) Patent No.: US 12,328,502 B2
(45) Date of Patent: Jun. 10, 2025

(54) SYSTEM AND METHOD FOR IMAGE AUTO-FOCUSING

(71) Applicant: Black Sesame Technologies Inc., San Jose, CA (US)

(72) Inventors: Jiaoyang Yao, Singapore (SG); Fangwen Tu, Singapore (SG); Bo Li, Singapore (SG)

(73) Assignee: Black Sesame Technologies Inc., San Jose, CA (US)

( * ) Notice: Subject to any disclaimer, the term of this patent is extended or adjusted under 35 U.S.C. 154(b) by 45 days.

(21) Appl. No.: 17/988,092

(22) Filed: Nov. 16, 2022

(65) Prior Publication Data

US 2024/0163554 A1    May 16, 2024

(51) Int. Cl.
*G06T 7/521* (2017.01)
*G01S 17/86* (2020.01)
*G01S 17/894* (2020.01)
*G06T 7/277* (2017.01)
*H04N 23/611* (2023.01)
*H04N 23/67* (2023.01)

(52) U.S. Cl.
CPC .......... *H04N 23/671* (2023.01); *G01S 17/86* (2020.01); *G01S 17/894* (2020.01); *G06T 7/277* (2017.01); *G06T 7/521* (2017.01); *H04N 23/611* (2023.01); *H04N 23/675* (2023.01); *G06T 2207/10024* (2013.01); *G06T 2207/10028* (2013.01); *G06T 2207/10048* (2013.01); *G06T 2207/20021* (2013.01); *G06T 2207/30196* (2013.01)

(58) Field of Classification Search
CPC ...... G06V 10/764; G06V 10/82; G06V 40/28; G06V 20/58; G06V 10/143; G06V 10/762
USPC .......................................................... 348/164
See application file for complete search history.

(56) References Cited

U.S. PATENT DOCUMENTS

| | | | |
|---|---|---|---|
| 7,982,794 B2 | 7/2011 | Wernersson | |
| 9,734,562 B2 | 8/2017 | Tay | |
| 2009/0186655 A1* | 7/2009 | Wernersson | H04N 23/671 348/E5.045 |
| 2017/0018114 A1* | 1/2017 | Stewart | G06T 5/50 |
| 2020/0191532 A1* | 6/2020 | Norris | F42B 12/68 |
| 2021/0255307 A1* | 8/2021 | Bongio Karrman | G01S 13/723 |
| 2021/0370505 A1* | 12/2021 | Rubæk | B25J 13/086 |
| 2022/0279136 A1* | 9/2022 | Tanaka | H04N 23/75 |
| 2023/0097592 A1* | 3/2023 | Feng | G06T 7/207 382/100 |
| 2023/0267735 A1* | 8/2023 | Fu | G06T 7/248 382/103 |

* cited by examiner

*Primary Examiner* — Masum Billah
(74) *Attorney, Agent, or Firm* — Timothy T. Wang; Ni, Wang & Massand, PLLC

(57) ABSTRACT

The invention discloses an active auto-focus tracking system using a time-of-flight (ToF) depth sensor. The ToF sensor serves as a rangefinder and also provides environmental depth information. The active auto-focus system includes a compressive tracking algorithm to track the movement of an object. The active auto-focus tracking system can acquire subject depth information regardless of various lighting conditions, subject positions, and visual patterns. Moreover, the system can perform an improved acquisition of focusing distance in both normal and low-level lighting conditions.

15 Claims, 9 Drawing Sheets

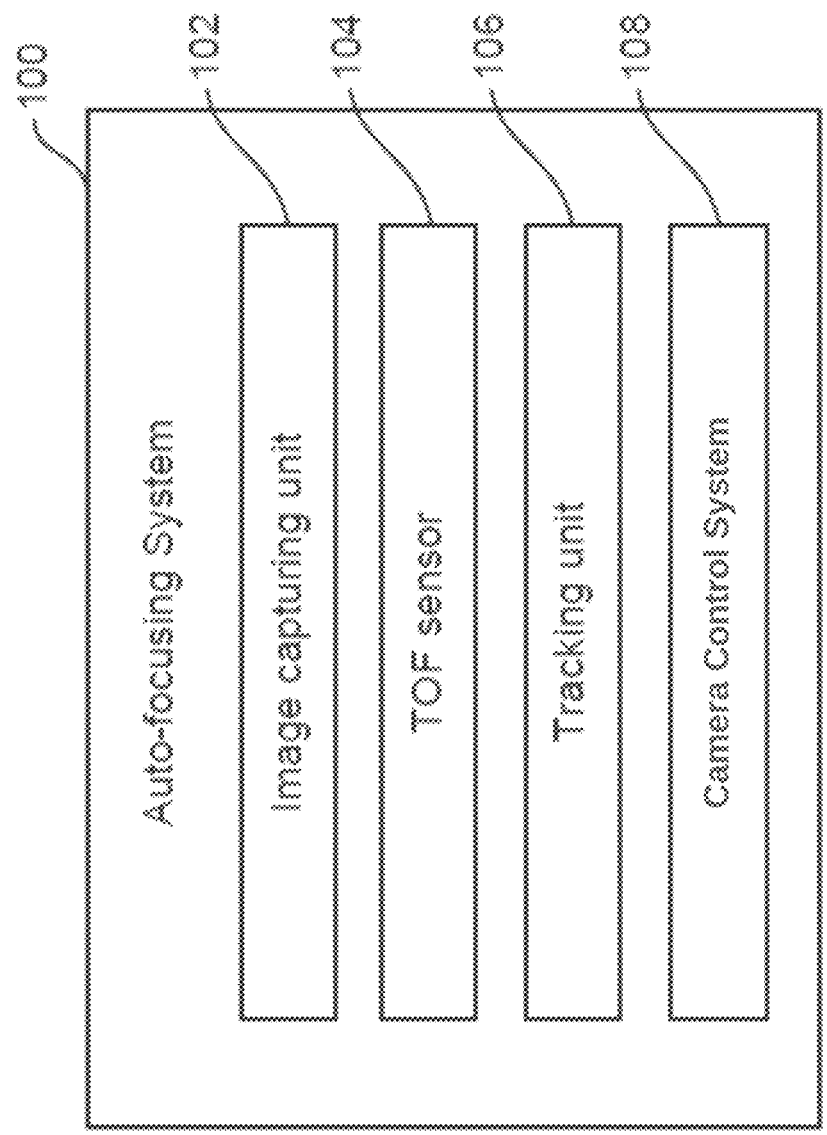

SYSTEM AND METHOD FOR IMAGE AUTO-FOCUSING

FIELD OF THE INVENTION

The present invention relates to an active auto-focus solution with A Time-of-Flight (ToF) sensor that can acquire subject depth information regardless of lighting condition, subject position, or visual pattern. Specifically, the present invention can perform improved acquisition of focusing distance in both normal and low-level lighting to better obtain the focusing distance under certain conditions.

BACKGROUND

Photographic equipment, such as digital cameras, generally contain electronic image sensors that capture light for processing into still and/or video images. Electronic image sensors typically contain millions of light capturing elements such as photodiodes.

Many image capturing devices include an auto-focusing system. The process of auto-focusing includes the steps of capturing an image, processing the image to determine whether it is in focus, and if not, generating a feedback signal that is used to vary a position of a focus lens, i.e., a focus position. There are primarily two such auto-focusing techniques. The first technique involves contrast measurement, while the other technique utilizes a phase difference between a pair of images. In the contrast method the intensity difference between adjacent pixels is analyzed and the focus is adjusted until a maximum contrast is detected. Although acceptable for still pictures, the contrast technique is not suitable for video.

The phase difference method includes splitting an incoming image into two images that are captured by separate image sensors. The two images are compared to determine a phase difference. The focus position is then adjusted until the two images match. The phase difference method requires additional parts such as a beam splitter and an extra image sensor. Additionally, the phase difference approach analyzes a relatively small band of fixed detection points which is prone to noise related error. This technique is also ineffective if the detection points do not coincide with an image edge. Finally, because the phase difference method splits the light, the amount of light that strikes a light sensor is greatly reduced. This can be problematic in dim settings where the image light intensity is already low.

U.S. Pat. No. 7,982,794 discloses digital cameras with a triangulation auto focus system. The system includes a spot beam emitter which is used to project a spot onto a subject that is captured in an image. The system is used to automatically determine a subject to camera distance.

U.S. Pat. No. 9,734,562 discloses a system capable of auto-focusing electronically captured images. The auto-focus image system including a pixel array coupled to a focus signal generator. The pixel array captures an image that has a plurality of edges. The edge-sharpness measure is a quantity that has a unit that is a power of a unit of length. The generator reduces a relative extent to which an edge contributes to the focus signal on the basis of detecting that the edge does not have sufficient reflection symmetry in a sequence of gradients of an image signal across the edge according to a predefined criterion. The edge may be prevented from contributing altogether.

Said patents describe the auto-focusing of the subject and different technologies to achieve the required result. However, the approaches are traditional for auto-focusing as the inventions fail to auto-focus on human subjects and do not include the use of a Time of Flight (ToF) sensor, thereby failing to achieve the desired quality.

The prior art described above only maintains a monotonous system that has limited flexibility and involves a restricted type of operation tasked to enhance videos of various genre. Although many applications adopt deep learning, which is a learned based approach, instead of conventional methods to achieve better performance on these demanding technologies, there has not been an invention in which the system is able to enhance videos intelligently, adaptively, and flexibly. Additionally, existing systems also do not properly take into account user experience. In other words, there is not a single paradigm in video enhancement as each individual has his/her own personal preference.

Therefore, to overcome the shortcomings of the prior art, there is a need to provide an active auto-focus solution with a ToF sensor that can acquire subject depth information regardless of lighting conditions, subject positions, and visual patterns. Additionally, an invention which performs accurate and rapid acquisition of focusing distance in both normal and low-level illuminating conditions is needed.

It is apparent now that numerous methods and systems are developed in the prior art that are adequate for various purposes. Furthermore, even though these inventions may be suitable for the specific purposes to which they address, they would not be suitable for the purposes of the present invention as heretofore described. Thus, there is a need to provide an active auto-focus solution with a ToF sensor which performs a more accurate and rapid acquisition of focusing distance in both normal and low-level illuminating conditions.

SUMMARY

An objective of the invention is to provide an active auto-focus solution with a ToF sensor that can acquire subject depth information regardless of lighting conditions, subject positions, and visual patterns. Particularly, the invention can perform an improved acquisition of focusing distance in both normal and low-level lighting conditions. The invention comprises a ToF sensor, a Single Shot Multi-Box Detector (SSD), a Hungarian algorithm, a compressive tracking algorithm, and a Kalman filter. The ToF sensor is installed which not only serves as a rangefinder, but also provides environmental depth information.

The SSD is configured for real-time human detection. The Hungarian algorithm is used to solve graph matching problems in object and human detection. The compressive tracking algorithm is a deep learning process where the algorithm tracks the movement of an object. The Kalman Filter is used to track human position through analysis of visual motion and prevent the SSD from detecting a human in every frame and further reduces computation resource requirements.

The invention further discloses a light condition in a sensitive auto focus tracking system using a ToF sensor distance information to guide camera focus. A distinctive feature of the invention is using tracking algorithms to track the movement of an object.

The invention further discloses a fast RGB contrast focus solution using ToF distance information to reduce RGB contrast searching range. Another distinctive feature of the invention is using both a ToF senor and a RGB mode to focus distance range proposed by the ToF sensor followed by a refining search based on RGB mode to synchronize the ToF depth information and RGB contrast with video frames to keep focus on a subject.

The invention further discloses a region of interest (ROI) focus tracking method based on ToF and IR images to solve the texture-less issue of depth image. The invention is configured via a user defined tracker which is performed with the help of user inputs for replacing the human tracker with the tracker of a user-selected region. Another distinctive feature of the invention is the use of a Hungarian algorithm to solve graph matching problems in object detection. Also, a use compressive tracking algorithm can track the movement of an object. A Kalman filter is used to track object position through analysis of visual motion.

Other objectives and aspects of the invention will become apparent from the following detailed description, taken in conjunction with the accompanying drawings, which illustrate, by way of example, the features in accordance with several embodiments of the invention.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

Although, the invention is described above in terms of various exemplary embodiments and implementations, it should be understood that the various features, aspects, and functionality described in one or more of the individual embodiments are not limited in their applicability to the particular embodiment with which they are described, but instead can be applied, alone or in various combinations, to one or more of the other embodiments of the invention, whether or not such embodiments are described and whether or not such features are presented as being a part of a described embodiment. Thus, the breadth and scope of the present invention should not be limited by any of the described exemplary embodiments.

BRIEF DESCRIPTION OF THE DRAWINGS

The objects and features of the present invention will become more fully apparent from the following description and appended claims, taken in conjunction with the accompanying drawings. Understanding that these drawings depict only typical embodiments of the invention and are, therefore, not to be considered limiting of its scope. The invention will be described and explained with additional specificity and detail through the use of the accompanying drawings.

FIG. 1A illustrates an image auto-focusing system in accordance with the present invention;

DETAILED DESCRIPTION

Figure 1B:
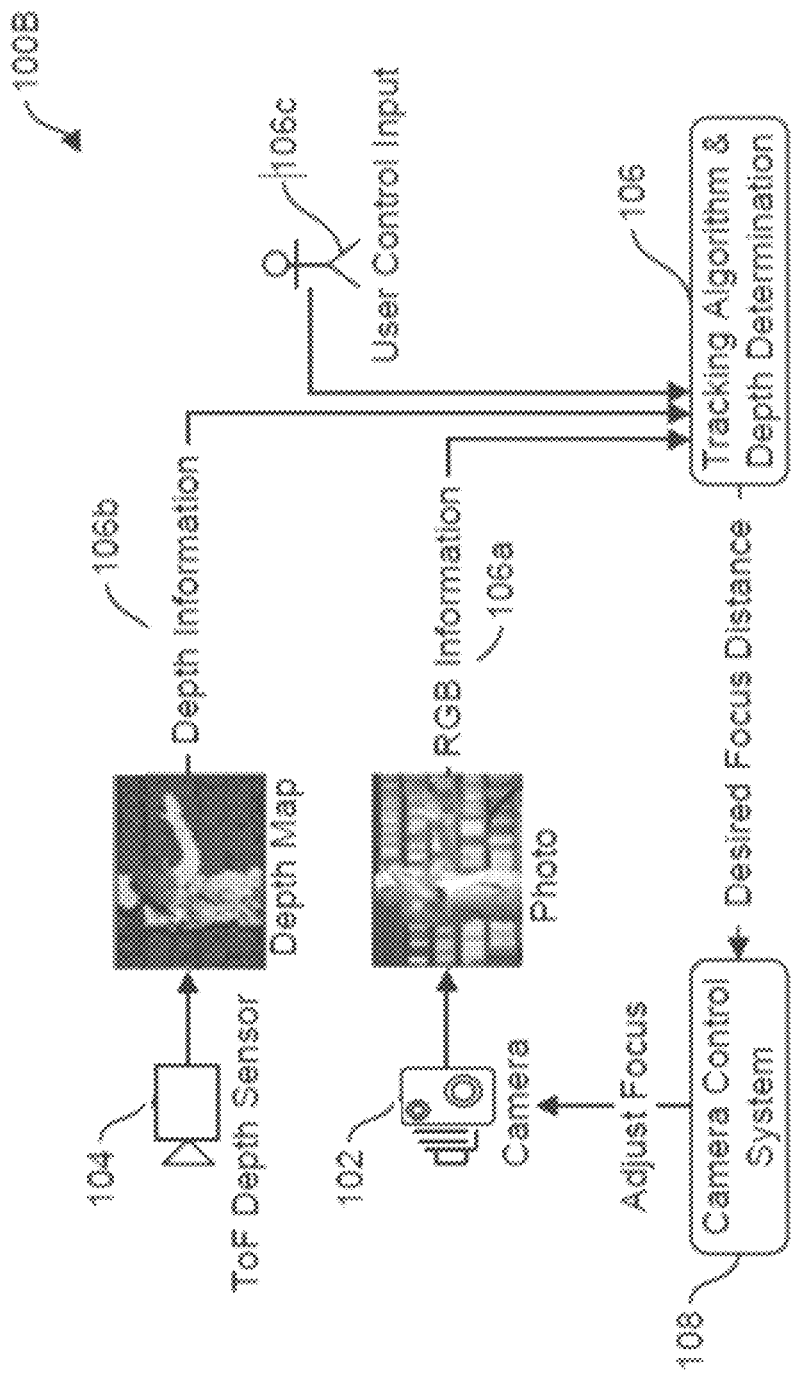
FIG. 1B illustrates a schematic diagram of the autofocus system in accordance with the present invention.

Auto-focus is a feature of digital cameras that the camera to focus on a subject without manual adjustments. Mobile devices with fixed-focus cameras use passive auto-focus with contrast measurement. On one hand, a passive auto-focusing system cannot find a stable focus plane because of texture-less, e.g., a blank wall, and low-light conditions. On the other hand, a passive auto-focusing system also struggles to track a constantly moving subject because of contrast processing speed.

The system disclosed herein utilizes a ToF sensor to determine a depth map of the photography environment, so that an active auto-focus algorithm can be achieved regardless of lighting conditions and subject visual patterns. In cooperation with subject tracking, sensor fusion, and human skeleton algorithms, advanced auto-focus strategies can be applied in different situations to stably focus when recording videos.

The active auto-focus solution with a ToF sensor can acquire subject depth information regardless of lighting conditions, subject position, and visual patterns. The system performs improved acquisition of focusing distance in both normal and low-level lighting conditions.

The ToF sensor acts as a fast depth region acquisition for further contrast-based refinement. Compared with a fully contrast-based method which needs to search in wide range of distance (from closest to furthest distance), ToF information can drastically reduce the searching time.

Object tracking, and instance detection can be performed on a ToF depth map to track and determine focusing subject continuously, which can prevent a "back-and-forth" effect when subject is moving. ToF focusing works in low-light and backlight situations in which RGB focus fails. ToF focusing also applies to other active auto-focus systems with rangefinders of other types, including ultrasonic sound waves and infrared lights.

An autofocus optical system uses a sensor, a control system, and a motor to focus on an automatically or manually selected point or area. Autofocus methods are distinguished by their type as being either active, passive, or hybrid variants. Most mobile devices use passive autofocus systems based on contrast measurement, which can hardly provide a stable and accurate focus in video recording scenarios where the subject moves continuously.

Some modern mobile devices have ToF sensors installed, which not only serve as a rangefinder, but also provide environmental depth information. Based on this information, we introduced an adaptive and intelligent autofocus system to keep a stable focus in various scenes and provides a faster and smoother experience in mobile photography.

FIG. 1A illustrates an auto-focusing system configured to focus on a subject in an input image. The auto-focusing system 100 comprises an image capturing unit 102, a ToF sensor 104, a tracking unit 106, and a control unit 108. The image capturing unit 102 captures the image to define an image RGB value and divides the image into a number of frames.

The TOF 104 sensor senses active IR emission within the number of frames to determine a depth to identify the subject in the image. The tracking unit 106 determines a focus distance of the subject based on the image RGB value and the depth. The tracking unit can also track the subject continuously. The control unit 108 provides auto-focus of the subject in the image based on the focus distance.

The image capturing unit 102 captures an input image and defines image RGB data, while the camera module categorizes the input image into a number of frames. The TOF sensor 104 utilizes active IR emission to acquire depth information from an input image.

The tracking unit 106 includes at least one tracking algorithm based on user control input 106c. The tracking algorithm receives RGB data and depth information from the camera and TOF sensor to generate a focus distance. Furthermore, the tracking algorithm performs tracking to keep focus on a subject.

The control unit 108 for receives the focus distance from depth determination module and adjusts the focus according to the focus distance.

The system utilizes TOF sensor 104 for automatic human detection and tracking. The optical system includes a ToF sensor, a single shot multi-box detector, and a tracker.

The TOF sensor 104 provides a continuous 3D position of the subject in the form of TOF stream and IR stream. The single shot multibox detector detects a human in the TOF stream by generating a bounding box for each detected human. The tracker tracks one or more subjects according to the user defined tracker by utilizing tracker matching algorithms.

In an embodiment, a tracker matching algorithm is used when the subject is detected automatically, and the subject is tracked. In another embodiment, a user defined tracker is used when the subject is not detected, or more than one subject is detected.

The subject detection is done with a Single Shot Multi-Box Detector (SSD), where the subject is a human or an object. The SSD includes a hierarchy of multiple grid cells. The SSD determines a bounding box for each detected human or object. The bounding box includes a head location detector to perform head detection of the detected human.

The tracking can be performed with a Kalman filter. The Kalman Filter tracks the human position through analysis of visual motion, preventing the SSD from detecting a human in every frame and reducing computation resource requirement.

FIG. 1B illustrates a schematic diagram of the autofocus system to focus a subject on an input image 100B. The system can be controlled to keep focusing on subjects which are designated either automatically or manually.

The system takes ToF depth image or both of ToF Depth image 104 and RGB image 102 as input. For each pair of ToF+RGB input with designated focusing subject, ToF depth information 106b will quickly give focus distance. For ToF+RGB mode, the focus distance range proposed by ToF Sensor will be followed by a refining search based on RGB contrast will be performed within as small range around ToF focus distance.

As the ToF depth information is synchronized with video frames, object detection and tracking can be performed to keep focus on a subject. Benefit from active IR characteristic of ToF sensor, the depth acquirement and tracking algorithms are not affected by light condition, which extends the scope of working environment comparing to RGB contrast-based autofocus solutions.

Fast autofocus using ToF Sensor: RGB contrast-based autofocus solution is completed by adjusting optical until the maximal contrast is detected by the camera control system 108. In this solution no actual distance measurement is involved, thus creates challenges when tracking moving subjects. In each of the following iterations, a significant "zooming" effect will be observed, which not only affect the filming smoothness but also takes time.

ToF sensor can provide depth map of the full frame and determine a small focus searching range whose size is dependent on precision of the sensor. RGB max-contrast search can be performed within a small range to get a refined focus distance. Additionally, constant distance measurement helps tracking moving subjects with stable focus on it.

TABLE 1

Performance Comparison of Different Sensor Combination

| | ToF | ToF + RGB | RGB only |
|---|---|---|---|
| Work Principle Solution | Active Depth Map | Active Depth Map + Contrast Detection | Passive Contrast Detection |
| Workflow | ToF determines focus distance | ToF determines focus distance + RGB max-contrast search in a small range | Max-contrast search in full distance range |
| Autofocus Speed | Fastest | Fast | Slow + Significant "Zooming" Effect |
| Track Moving Subjects | Yes | Yes | Challenging |
| Low-light Robustness | High | High | Low |

Figure 2A:
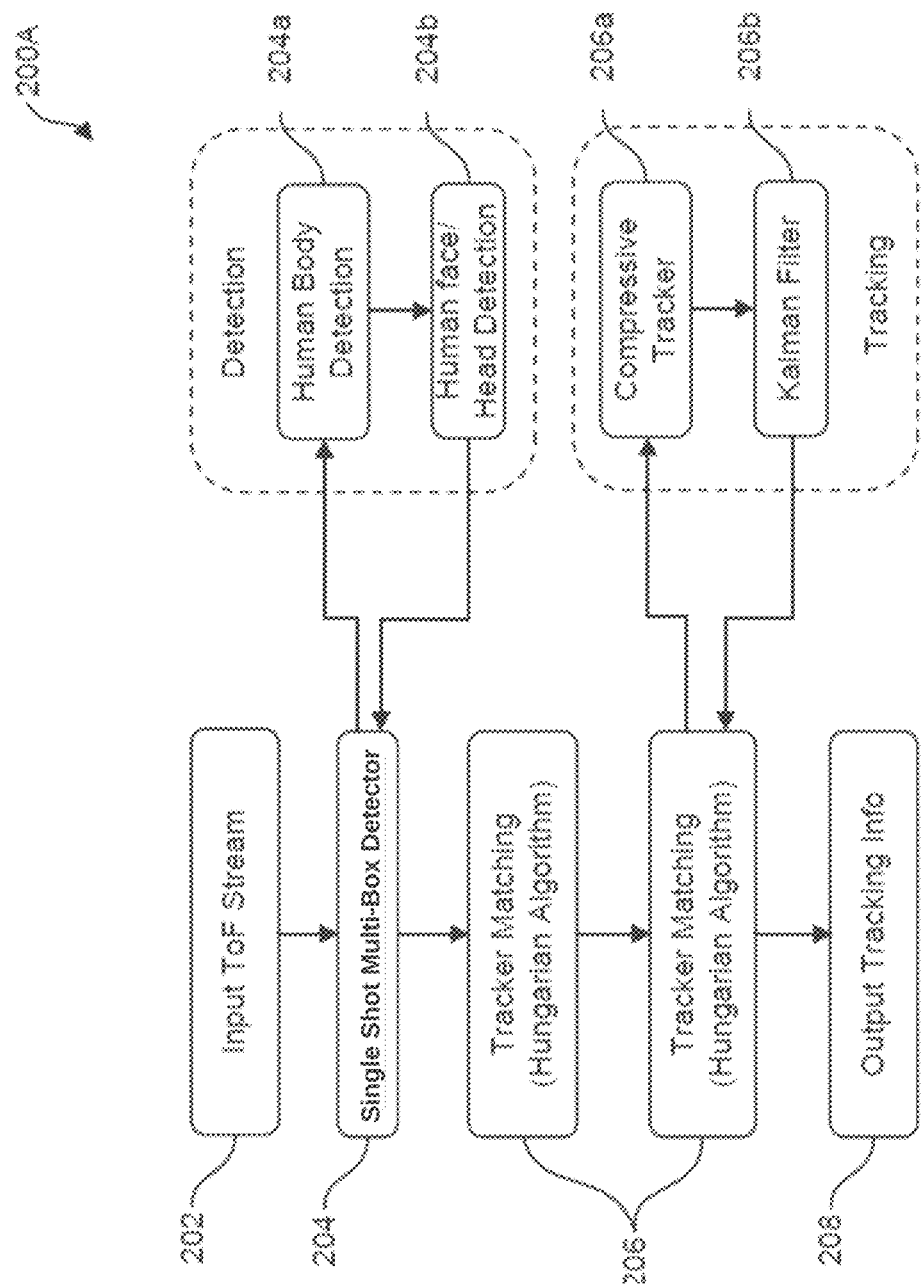
FIG. 2A illustrates a workflow of the auto human tracking mode in accordance with the present invention.

FIG. 2A illustrates a workflow of the auto human tracking mode for the subject detection 200A. The Head/Human Detection and Tracking using ToF: To keep focusing on moving human is challenging for contrast detection autofocus because it does not involve real distance measurement. Aside from distance information, object detection tracking on a 2D human image also lacks robustness due to light/pattern changes and partial occlusion. ToF sensor not only provides continuous 3D position of the subject for focus distance adjustment, but also provides a stable contour regardless of pattern/illumination changes.

The real-time human detection can be done with the help of Single Shot Multi-Box Detector (SSD) 204 with an input TOF stream 202. The SSD further includes human body detection 204a and human head/face detection 204b. With the help of a hierarchy of grid cells, SSD determines a bounding box for each detected human. A face/head location detection 204b can be performed within the human body bounding box. The tracking algorithm (Hungarian Algorithm) 206 performs the tracking on the detected subject. The tracking algorithm further includes a compressive tracker 206a and a Kalman filter 206b. When performing on video stream, Kalman Filter 206b will be used to track human position through analysis of visual motion, which prevents the SSD from detecting a human in every frame and further reduces computation resource requirement and releases the output tracking information 208.

Figure 2B:
FIG. 2B illustrates a body tracking demo in accordance with the present invention.

FIG. 2B illustrates a body tracking demo 200B. A depth determination module includes a tracking algorithm. The tracking algorithm receives RGB information and depth information from camera and TOF sensor to generate a focus distance. The tracking algorithm performs tracking to keep focus on a filming subject for subject detection in all different frames (208a, 208b and 210a, 210b and 212a, 212b).

Figure 3A:
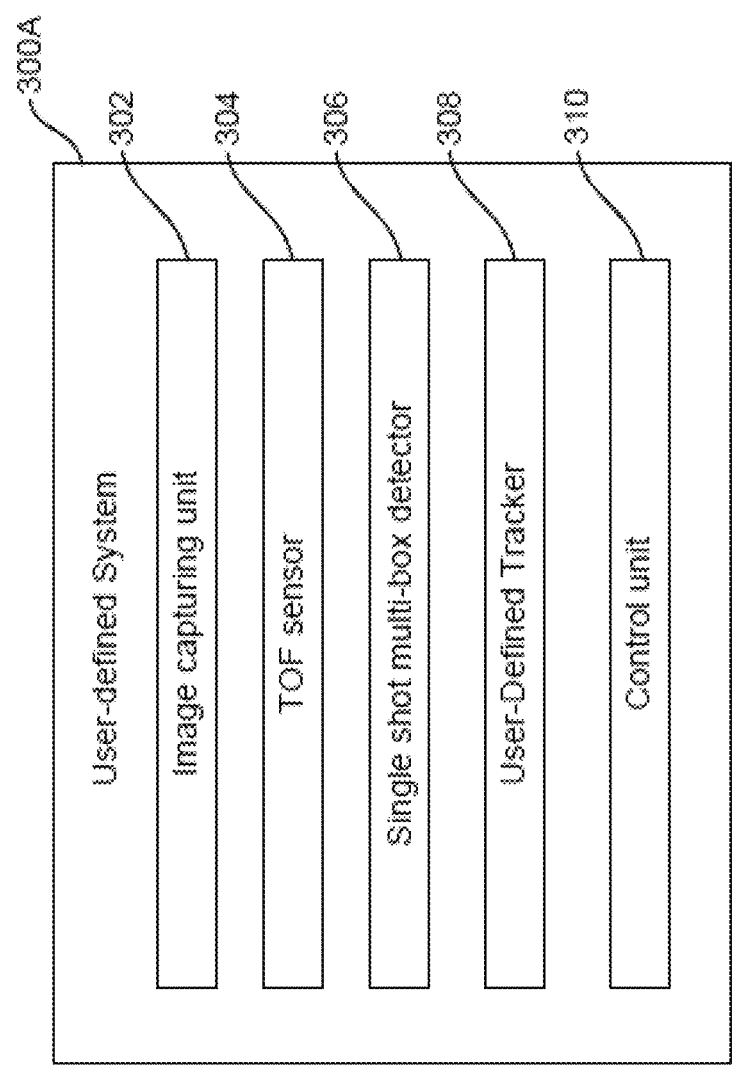
FIG. 3A illustrates a user-defined system in accordance with the present invention.

FIG. 3A illustrates a user-defined system configured to focus on a subject in an input image. The user-defined system 300A comprises an image capturing unit 302, a ToF sensor 304, a single shot multi-box detector 306, a tracking unit 308, and a control unit 310.

The image capturing unit 302 captures the image to provide RGB data and to divide the image into a number of frames. The ToF sensor 304 determines a depth to identify subjects in the image. Further, the ToF sensor 304 provides a three-dimensional position of the subjects in the image in the form of a TOF stream and an IR Stream.

The single shot multi-box detector 306 detects the subjects in the TOF stream by generating a subject bounding box. The tracking unit 308 tracks the subjects by utilizing one or more tracking algorithms, while the control unit 310 receives the user-defined subject selection from the user and provides focus on the user-defined subject.

Figure 3B:
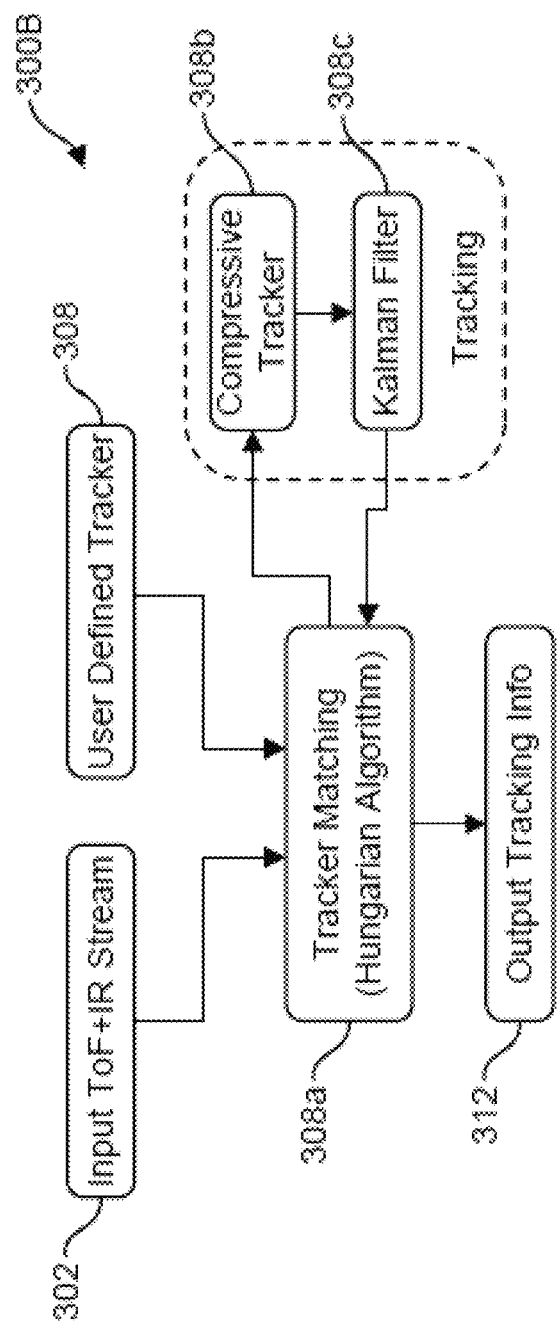
FIG. 3B illustrates a workflow of a user-defined system in accordance with the present invention.

FIG. 3B illustrates a workflow of the auto-human tracking mode. A generic subject tracking may use ToF 300B. In the situations where more than one person shows up or no obvious subject is detected, a generic subject tracking (tracker matching) 308a based on Input ToF+IR stream 302 should be performed with the help of user inputs by the user defined tracker 308. As shown in FIG. 3B, the same tracking pipeline of human tracking can be utilized by replacing the human tracker or the user defined tracker 308 with the tracker of user-selected region. The tracking includes a compressive tracker 308b and a Kalman filter 308c. Since ToF depth information may not be stable enough for generic objects, the IR image from ToF sensor with more output tracking information 312 will be involved in tracker generation and tracking.

Figure 4:
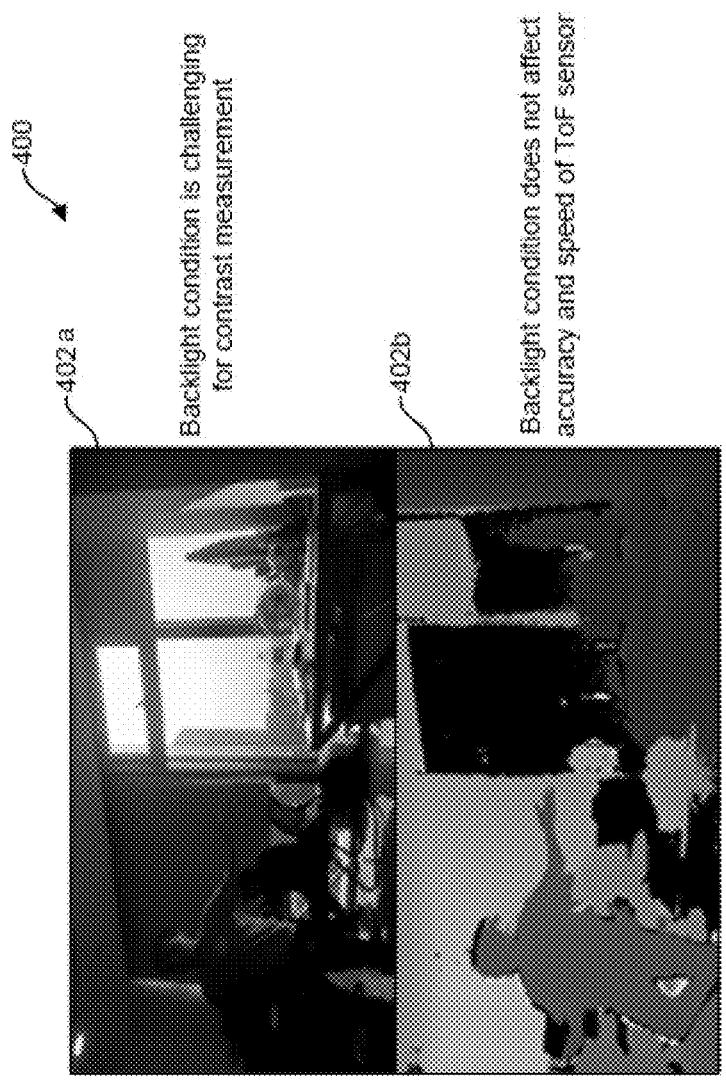
FIG. 4 illustrates the illumination robustness of a ToF sensor in accordance with the present invention.

FIG. 4 illustrates an illumination robustness of the ToF Sensor. The ToF Sensor in challenging light conditions 400: The contrast detection solution is dependent on a visible light condition, which makes low-light and backlight conditions challenging for autofocus algorithm 402a. Backlight condition does not affect accuracy and speed of ToF sensor 402b. ToF sensor uses an active IR emission device to acquire environmental depth information and is not affected by visible light condition. The ToF autofocus can be performed in lowlight or backlight conditions at the same speed.

Although benefiting from the illumination robustness and speed advantage, the ToF information may not provide a focused result as accurate as a RGB contrast method. Thus, an RGB+ToF combination is preferred if working conditions are satisfied. The three solutions are compared on different perspectives in Table 1, in which we show that the RGB+ToF combination can optimize a good performance trade off between single sensor solutions.

Figure 5A:
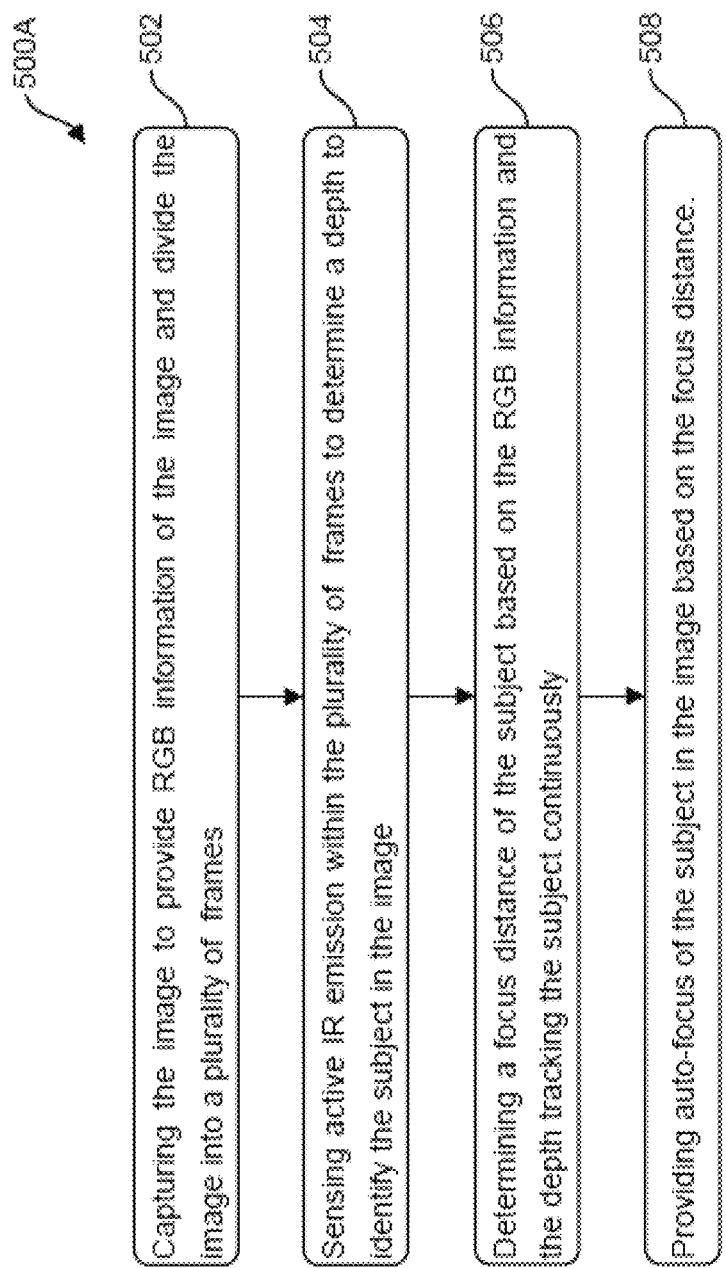
FIG. 5A illustrates an autofocus method in accordance with the present invention.

FIG. 5A illustrates an autofocus method for focusing on a subject in an image 500A. The method includes three main steps: (1) subject identification, (2) subject detection, and (3) subject tracking where the subject is a human. The subject identification is performed with the help of a ToF depth sensor. Then, the detection is done on the basis of human, head, or body detection. The subject tracking is done either automatically or by user selection.

The method in detail includes the following steps. First, an image is captured by a camera. The image is then received from the camera or TOF depth sensor 502. The input image is divided into a number of frames and an object is detected. An active IR-emission is sensed within the number of frames to determine a depth to identify the subject 504. A first information and a second information is extracted from the input image. The first information is depth information extracted from the depth map generated via the TOF depth sensor and the second information is RGB contrast data generated via the camera.

A ToF focus distance is provided to the input image 506. The focus distance of the subject is based on the RGB data and the depth data, thereby tracking the subject continuously. An auto-focusing mode of operation is determined from a number of modes, including TOF+RGB mode which utilizes the depth information. A search is refined based on the RGB contrast performed within as small range around the ToF focus distance. The ToF focus distance of the image is synchronized with the number of frames and the subject detection and, finally, the detected object is tracked for focusing on the subject.

In an alternative embodiment, the mode is TOF mode. The ToF mode determines the focus distance based on the depth information provided by a depth map. In an alternative embodiment, the mode is RGB mode. The RGB mode performs a maximum contrast search in full distance range.

Figure 5B:
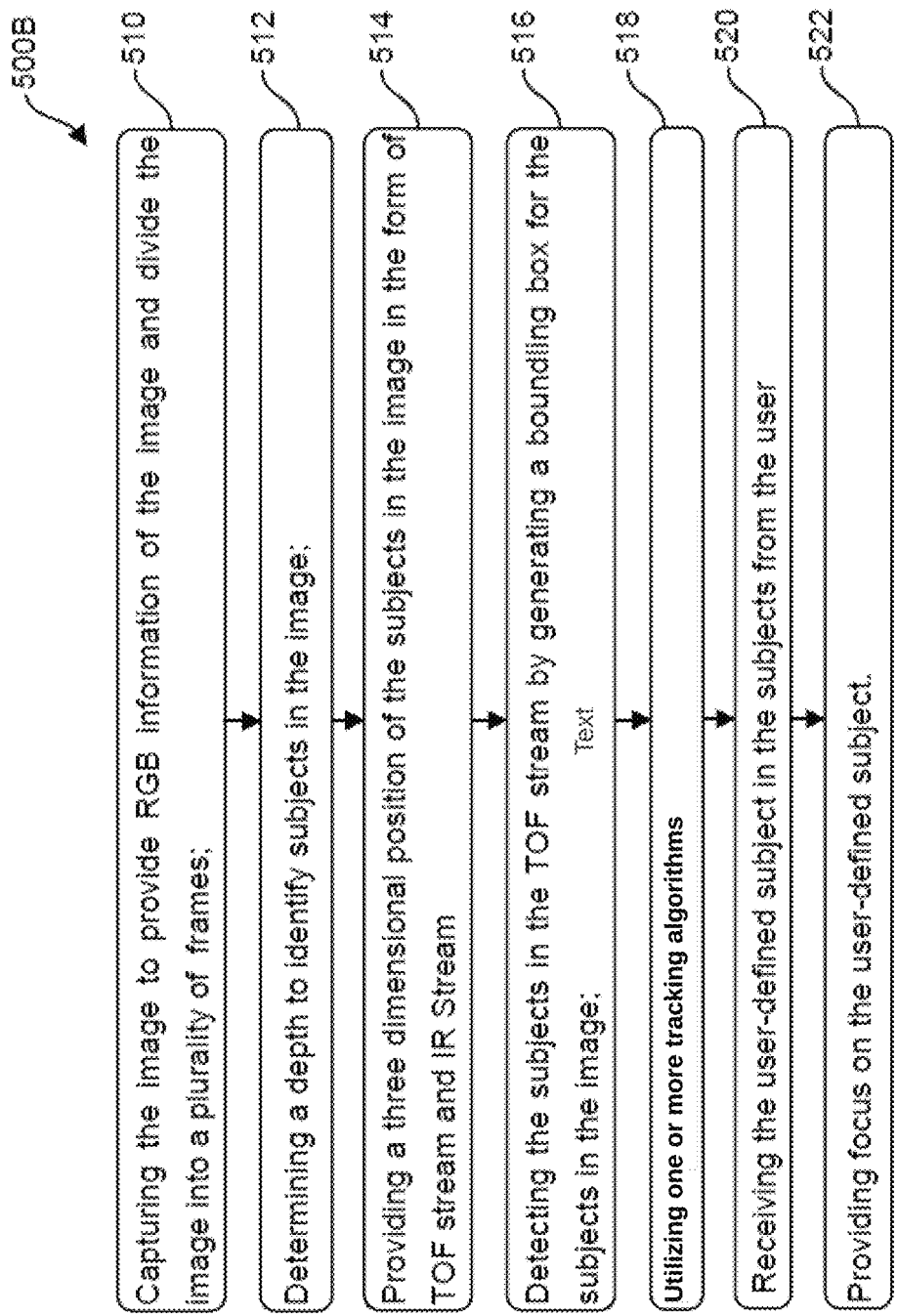
FIG. 5B illustrates a user defined method in accordance with the present invention.

FIG. 5B illustrates a user defined method for focusing on a subject in the image 500B. The method includes the following steps. First, an image is captured by a camera to provide RGB data and to divide the image into a number of frames 510. A depth is determined by the ToF sensor to identify subjects in the image 512;

The three-dimensional position of the subjects in the image is provided in the form of a TOF stream and an IR Stream 514. The subjects are detected in the TOF stream by generating a bounding box for the subjects in the image 516.

The image capturing unit 302 captures the image to provide RGB data of the image and to divide the image into a number of frames. The ToF sensor 304 determines a depth to identify subjects in the image. Further, the ToF sensor 304 provides a three dimensional position of the subjects in the form of a TOF stream and an IR Stream;

The single shot multi-box detector 306 detects the subjects in the TOF stream by generating a bounding box for the subjects in the image 516.

The subjects are tracked in the image by utilizing one or more tracking algorithms 518. The user-defined subject are selected by the user 520 and the focus is provided on the user-defined subject 522.

The tracking unit 308 tracks the subjects in the image by utilizing one or more tracking algorithms and the control unit 310 receives the user-defined subject selection from the user and provides focus on the user-defined subject.

Although, the invention is described above in terms of various exemplary embodiments and implementations, it should be understood that the various features, aspects, and functionality described in one or more of the individual embodiments are not limited in their applicability to the particular embodiment with which they are described, but instead can be applied, alone or in various combinations, to one or more of the other embodiments of the invention, whether or not such embodiments are described and whether or not such features are presented as being a part of a described embodiment. Thus, the breadth and scope of the present invention should not be limited by any of the above-described exemplary embodiments.

The presence of broadening words and phrases such as "one or more," "at least," "but not limited to" or other like phrases in some instances shall not be read to mean that the narrower case is intended or required in instances where such broadening phrases may be absent.

The invention claimed is:

1. An image auto-focusing system comprising:
    an image capturing unit configured to capture an image, to determine an image RGB value, and to divide the image into a number of frames;

a time-of-flight sensor configured to sense active infrared emission within the number of frames, to determine a depth, and to identify a subject in the image;

a tracking unit configured to determine a subject focus distance based on the image RGB value and the depth;

a control unit configured to auto-focus on the subject based on the focus distance, and a single shot multibox detector configured to detect the subject:

wherein the single shot multibox detector is further configured to determine a bounding box based on a hierarchy of grid cells; and wherein the bounding box comprises a head location detector configured to detect a head of the subject.

2. The system of claim 1, wherein the tracking unit is further configured to track the subject continuously.

3. The system of claim 1, wherein the subject is a human or an object.

4. The system of claim 1, wherein the bounding box comprises a head location detector configured to detect a head of the subject.

5. The system of claim 1 further comprising a Kalman filter configured to track the subject.

6. The system of claim 5, wherein the Kalman filter is further configured to track the subject by analyzing visual motion and to prevent the SSD from detecting the subject.

7. The system of claim 1, wherein a tracking unit is further configured to track the subject by utilizing at least one tracking algorithm.

8. The system of claim 7, wherein the tracking algorithm is a Hungarian algorithm configured to solve graph matching problems in the subject.

9. The system in accordance with claim 7, wherein the tracking algorithm is a compressive tracking algorithm configured to track the movement of the subject.

10. The system of claim 1, wherein the tracking unit further comprises a user-defined tracker configured to manually track the subject.

11. The system of claim 1, wherein the time-of-flight sensor is further configured to operate on a single operation mode of a number of operation modes wherein the number of operation modes comprise a time-of-flight mode, a RGB mode, and a combination mode.

12. The system of claim 11, wherein the combination mode comprises a combination of the time-of-flight mode and the RGB mode.

13. The system of claim 11, wherein the time-of-flight mode is configured to determine the focus distance based on the depth.

14. The system of claim 13, wherein a depth map is configured to provide the depth.

15. A subject detection and tracking system comprising:

an image capturing unit configured to capture an image, to define an image RGB value, and to divide the image into a number of frames;

a time-of-flight sensor configured to determine a depth to identify one or more subjects in the image and to provide a three-dimensional positioning of the subjects in the form of a time-of-flight stream and an infrared stream;

a single shot multi-box detector configured to detect the subjects in the time-of-flight stream by generating a bounding box for the subjects;

a tracking unit configured to track the subjects by utilizing one or more tracking algorithms;

a control unit configured to receive a user-defined subject selection and to provide focus on the user-defined subject; and wherein the single shot multibox detector is further configured to determine a bounding box based on a hierarchy of grid cells; and wherein the bounding box comprises a head location detector configured to detect a head of the subject.

* * * * *